(12) United States Patent
Stewart, II et al.

(10) Patent No.: US 11,326,867 B1
(45) Date of Patent: May 10, 2022

(54) SYSTEMS AND METHODS FOR IDENTIFYING MISALIGNED WHEELED IRRIGATION TOWERS

(71) Applicant: Orbit Irrigation Products, LLC, North Salt Lake, UT (US)

(72) Inventors: James G. Stewart, II, Springville, UT (US); Brad J. Wardle, Kaysville, UT (US)

(73) Assignee: Orbit Irrigation Products, LLC, North Salt Lake, UT (US)

( * ) Notice: Subject to any disclaimer, the term of this patent is extended or adjusted under 35 U.S.C. 154(b) by 778 days.

(21) Appl. No.: 16/183,296

(22) Filed: Nov. 7, 2018

Related U.S. Application Data

(60) Provisional application No. 62/582,885, filed on Nov. 7, 2017.

(51) Int. Cl.
*G01B 7/30* (2006.01)
*A01G 25/09* (2006.01)

(52) U.S. Cl.
CPC .............. *G01B 7/30* (2013.01); *A01G 25/092* (2013.01)

(58) Field of Classification Search
CPC ............ A01G 25/00; A01G 25/09–097; A01G 25/16; G01B 7/30
See application file for complete search history.

(56) References Cited

U.S. PATENT DOCUMENTS

| | | | | |
|---|---|---|---|---|
| 4,073,309 A | * | 2/1978 | Fraser | A01G 25/092 239/731 |
| 4,127,181 A | * | 11/1978 | Arndt | A01G 25/092 180/2.1 |
| 4,209,035 A | * | 6/1980 | Hait | A01G 25/092 239/728 |
| 5,927,603 A | * | 7/1999 | McNabb | A01G 25/092 239/63 |
| 6,254,018 B1 | * | 7/2001 | Ostrom | G01S 19/14 239/731 |
| 6,512,992 B1 | * | 1/2003 | Fowler | A01B 79/005 701/50 |
| 7,953,550 B1 | * | 5/2011 | Weiting | A01G 25/092 701/468 |
| 10,098,291 B2 | | 10/2018 | Andrews | |

(Continued)

*Primary Examiner* — Huy Q Phan
*Assistant Examiner* — David B Frederiksen
(74) *Attorney, Agent, or Firm* — Austin Rapp

(57) ABSTRACT

Circuitry for identifying a misaligned wheeled irrigation tower within a plurality of wheeled irrigation towers is described. The circuitry includes a test resistance configured for installation in a center pivot irrigation system. The circuitry also includes a plurality of resistances. Each of the plurality of resistances is configured for installation in a wheeled irrigation tower of the center pivot irrigation system and to be coupled in series with the test resistance. Each of the plurality of resistances is configured to be coupled to a corresponding switch of a respective wheeled irrigation tower and a neutral line. The circuitry further includes detection circuitry coupled to the test resistance. The detection circuitry is configured, when installed in the center pivot irrigation system, to identify a misaligned wheeled irrigation tower of a plurality of wheeled irrigation towers based on a voltage corresponding to the test resistance.

20 Claims, 10 Drawing Sheets

(56) References Cited

U.S. PATENT DOCUMENTS

| | | | |
|---|---|---|---|
| 2013/0226356 A1* | 8/2013 | Pfrenger | A01G 25/092 700/284 |
| 2014/0346099 A1* | 11/2014 | Brantley | E03B 3/02 210/127 |
| 2019/0059352 A1* | 2/2019 | Miller | A01C 23/042 |

* cited by examiner

US 11,326,867 B1

SYSTEMS AND METHODS FOR IDENTIFYING MISALIGNED WHEELED IRRIGATION TOWERS

RELATED APPLICATION

This application is related to and claims priority to U.S. Provisional Patent Application Ser. No. 62/582,885, filed Nov. 7, 2017, for "SYSTEMS AND METHODS FOR IDENTIFYING A MISALIGNED WHEELED IRRIGATION TOWER," which is hereby expressly incorporated by reference in its entirety.

TECHNICAL FIELD

The present disclosure relates generally to irrigation systems. More specifically, the present disclosure relates to systems and methods for identifying a misaligned wheeled irrigation tower.

BACKGROUND

Irrigation systems have been implemented to deliver fluid (e.g., pressurized water). Small-scale and large-scale irrigation systems have been used. For example, irrigation systems may be used to water small lawns or large-scale farming plots.

In some cases, irrigation systems may malfunction. For example, irrigation system malfunctions may hinder the intended fluid delivery. This may cause under watering or over watering, for instance. As can be observed from these statements, improvements to irrigation systems are desirable.

BRIEF DESCRIPTION OF THE DRAWINGS

Various embodiments of the invention will become apparent from the following description and appended claims, taken in conjunction with the accompanying drawings. Understanding that these drawings depict only examples of the invention thereof and are, therefore, not to be considered limiting of the invention's scope, particular embodiments will be described with additional specificity and detail through use of the accompanying drawings in which:

Figure 1:
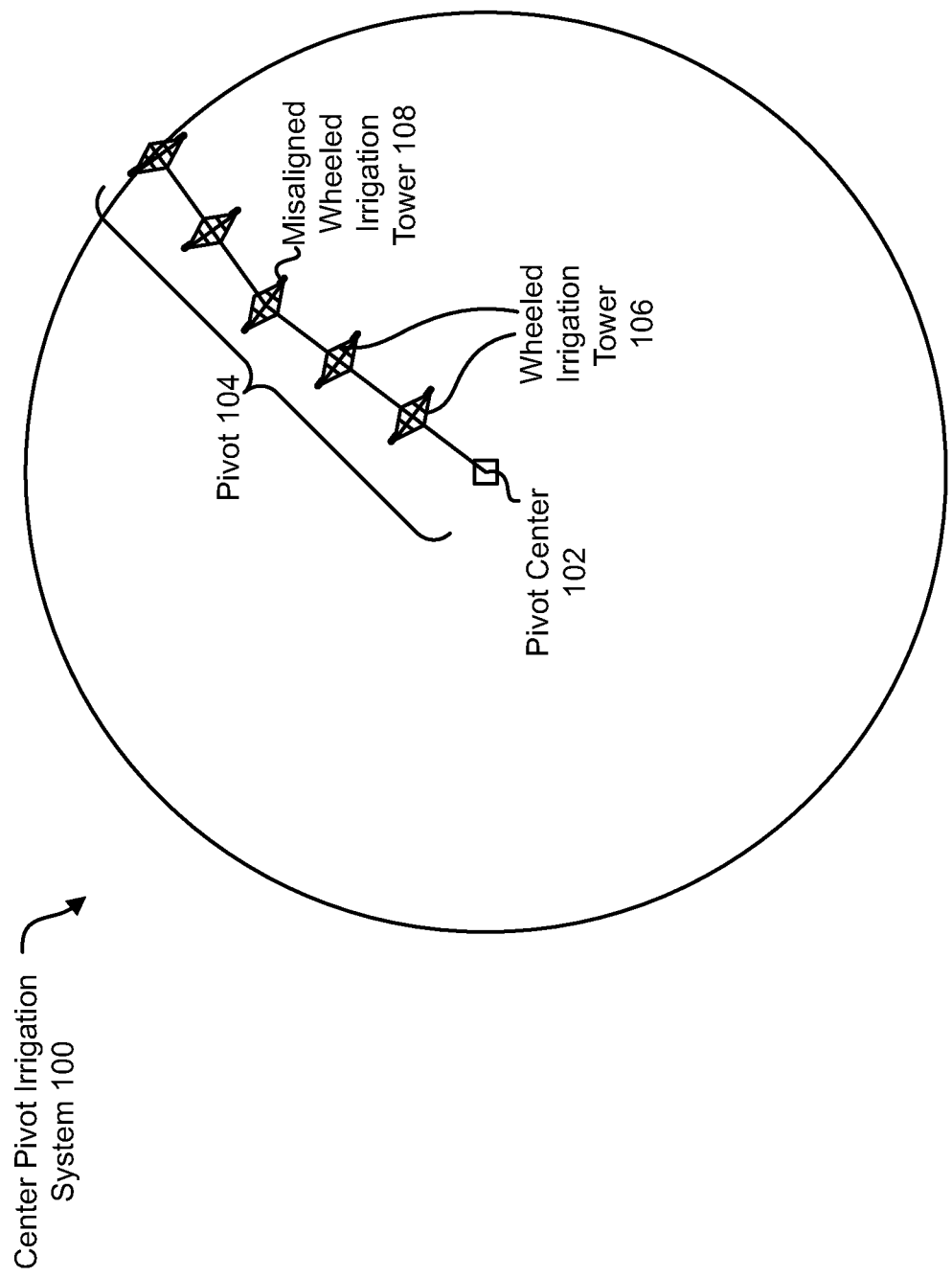
FIG. 1 is a diagram illustrating one example of a center pivot irrigation system.

In accordance with common practice, the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Circuitry for identifying a misaligned wheeled irrigation tower within a plurality of wheeled irrigation towers is described. The circuitry may include a test resistance configured for installation in a center pivot irrigation system. The circuitry may also include a plurality of resistances. Each of the plurality of resistances may be configured for installation in a wheeled irrigation tower of the center pivot irrigation system and to be coupled in series with the test resistance. Each of the plurality of resistances may be configured to be coupled to a corresponding switch of a respective wheeled irrigation tower and a neutral line. The circuitry may further include detection circuitry coupled to the test resistance. The detection circuitry may be configured, when installed in the center pivot irrigation system, to identify a misaligned wheeled irrigation tower of a plurality of wheeled irrigation towers based on a voltage corresponding to the test resistance. The detection circuitry may be configured to identify the misaligned wheeled irrigation tower based on an increase in the voltage corresponding to the test resistance relative to a first voltage corresponding to the test resistance when the plurality of wheeled irrigation towers are aligned.

Each resistance of the plurality of resistances may be configured to be coupled in parallel with each other resistance of the plurality of resistances. Each resistance of the plurality of resistances may be configured to be separated from the test resistance when the corresponding switch is opened as a result of a misalignment between the misaligned wheeled irrigation tower and a neighboring wheeled irrigation tower.

The detection circuitry may include an analog-to-digital converter configured to convert the voltage to a digital voltage signal. The detection circuitry may also include indicator circuitry that may be configured to identify the misaligned wheeled irrigation tower based on the digital voltage signal, and that may be configured to indicate the misaligned wheeled irrigation tower. The indicator circuitry may be a processor configured to compare the digital voltage signal to at least one threshold voltage. The indicator circuitry may be configured to identify the misaligned wheeled irrigation tower based on a look-up table.

The detection circuitry may be configured to compare the digital voltage signal to one or more calibration voltages. The detection circuitry may include an analog detection circuit configured to identify which of the plurality of wheeled irrigation towers is the misaligned wheeled irrigation tower.

The circuitry may include communication circuitry coupled to the detection circuitry. The communication circuitry may be configured to send an identification indication of the misaligned wheeled irrigation tower in response to the detection circuitry identifying the misaligned wheeled irrigation tower.

The circuitry may include communication circuitry configured to receive a plurality of wheeled irrigation tower deactivation indications. The detection circuitry may be configured to measure at least one calibration voltage in response to at least one of the plurality of wheeled irrigation tower deactivation indications. The detection circuitry may be configured to determine a plurality of threshold voltages based on the at least one calibration voltage.

A retrofit kit to enable identification of a misaligned wheeled irrigation tower within a plurality of wheeled irrigation towers is also described. The retrofit kit may include a test resistance configured to be coupled to a safety circuit of a center pivot irrigation system. The retrofit kit may also include a plurality of resistances. Each resistance of the plurality of resistances may be configured to be coupled to the safety circuit between a switch and a neutral line of a wheeled irrigation tower. The retrofit kit may further include detection circuitry configured to be coupled to the test resistance. The detection circuitry may be configured to identify a misaligned wheeled irrigation tower of a plurality of wheeled irrigation towers based on a voltage corresponding to the test resistance. The voltage may be based on which of the plurality of resistances is connected to the test resistance via the safety circuit. The detection circuitry may be configured to identify the misaligned wheeled irrigation tower based on an increase in the voltage corresponding to the test resistance relative to a first voltage corresponding to the test resistance when the plurality of wheeled irrigation towers are aligned.

Each resistance of the plurality of resistances may be configured to be coupled in parallel with each other resistance of the plurality of resistances. The detection circuitry may include an analog-to-digital converter configured to convert the voltage to a digital voltage signal. The detection circuitry may include indicator circuitry configured to identify the misaligned wheeled irrigation tower based on the digital voltage signal, and may be configured to indicate the misaligned wheeled irrigation tower.

The retrofit kit may include communication circuitry coupled to the detection circuitry. The communication circuitry may be configured to send an identification indication of the misaligned wheeled irrigation tower in response to the detection circuitry identifying the misaligned wheeled irrigation tower.

The retrofit kit may include instructions for installing the test resistance, the plurality of resistances, and the detection circuitry in the center pivot irrigation system. The retrofit kit may include a printed web address to instructions for installing the test resistance, the plurality of resistances, and the detection circuitry in the center pivot irrigation system.

A method for installing a retrofit kit in a center pivot irrigation system to enable identification of a misaligned wheeled irrigation tower is also described. The method may include attaching a test resistance and detection circuitry to a safety circuit of a center pivot irrigation system. The detection circuitry may be configured to identify a misaligned wheeled irrigation tower of a plurality of wheeled irrigation towers based on a voltage corresponding to the test resistance. The method may also include attaching each of a plurality of resistances between a switch and a neutral line of the safety circuit at a respective wheeled irrigation tower of the plurality of wheeled irrigation towers.

The method may include a calibration procedure. The calibration procedure may include deactivating each wheeled irrigation tower of the plurality of wheeled irrigation towers and sending a deactivation indication to the detection circuitry for each wheeled irrigation tower deactivation.

Various embodiments are now described with reference to the figures, in which like reference numbers may indicate functionally similar elements. The systems and methods as generally described and illustrated in the figures herein could be arranged and designed in a wide variety of different embodiments. Thus, the following more detailed description of several embodiments, as represented in the Figures, is not intended to limit scope, as claimed, but is merely representative of the systems and methods.

As used herein, the term "plurality" may indicate two or more. For example, a plurality of components may refer to two or more components. As used here, the term "couple" and variations thereof may denote a direct or indirect connection. For example, if a first component is coupled to a second component, then the first component may be directly connected to the second component (with one or more wires, for example) or may be indirectly connected to the second component through one or more other components. Further, it is to be appreciated that certain ordinal terms (e.g., "first" or "second") can be provided for identification and ease of reference and may not necessarily imply physical characteristics or ordering. Therefore, as used herein, an ordinal term (e.g., "first," "second," "third") used to modify an element, such as a structure, a component, an operation, etc., does not necessarily indicate priority or order of the element with respect to another element, but rather distinguishes the element from another element having a same name (but for use of the ordinal term). In addition, as used herein, indefinite articles ("a" and "an") can indicate "one or more" rather than "one." As used herein, a structure or operation that "comprises" or "includes" an element can include one or more other elements not explicitly recited. Thus, the terms "including," "comprising," "having," and variations thereof signify "including but not limited to" unless expressly specified otherwise. Further, an operation performed "based on" a condition or event can also be performed based on one or more other conditions or events not explicitly recited. As used in this application, the terms "an embodiment," "one embodiment," "another embodiment," or analogous language do not refer to a single variation of the disclosed subject matter; instead, this language refers to variations of the disclosed subject matter that can be applied and used with a number of different implementations of the disclosed subject matter. An enumerated listing of items does not imply that any or all of the items are mutually exclusive and/or mutually inclusive, unless expressly specified otherwise.

FIG. 1 is a diagram illustrating one example of a center pivot irrigation system 100. The center pivot irrigation system 100 may include a pivot center 102 and a plurality of wheeled irrigation towers 106. In the example shown in FIG. 1, the center pivot irrigation system 100 includes five wheeled irrigation towers 106. It should be noted that a different number of wheeled irrigation towers 106 may be utilized in various embodiments. Irrigation pipe may be mounted between the pivot center 102 and a wheeled irrigation tower 106, and between wheeled irrigation towers 106. The irrigation pipe may be supported by trusses. A structure between wheeled irrigation towers (including the irrigation pipe and the trusses, for example) may be referred to as a span. The wheels on each wheeled irrigation tower 106 allow the center pivot irrigation system 100 to rotate around the pivot center 102. The wheels may be driven by, for example, electrical motors and/or hydraulics. Sprinkler nozzles may be coupled to the irrigation pipe in order to deliver pressurized fluid (e.g., water, fertilizer, and/or pesticide). A combination of the wheeled irrigation towers 106, intervening sprinkler pipes, and/or optional trusses may be referred to as a pivot 104. In addition, it should be noted that intervening sprinkler pipes and optional trusses may be referred to as spans.

In various embodiments, the pivot 104 may rotate around the pivot center 102. For example, each wheeled irrigation tower 106 may move when that wheeled irrigation tower 106 comes out of line with one or more other wheeled irrigation towers 106. For instance, a wheeled irrigation tower 106 may trigger movement when the wheeled irrigation tower 106 comes out of line from another wheeled irrigation tower 106. Wheeled irrigation towers 106 that are farther away from the pivot center 102 move more often or faster on average than wheeled irrigation towers 106 that are closer to the pivot center 102.

In some cases, a wheeled irrigation tower 106 may become misaligned. As used herein, the terms "misalign," "misaligned," and other variations may refer to a wheeled irrigation tower that is out of line beyond a particular or specified amount or degree. For example, a wheeled irrigation tower may advance too far (e.g., beyond a particular or specified amount) ahead of one or more other wheeled irrigation towers. In another example, a wheeled irrigation tower may fall too far (e.g., beyond a particular or specified amount or degree) behind one or more other wheeled irrigation towers. As a consequence, the wheeled irrigation towers 106 may become misaligned. As illustrated in FIG. 1, the misaligned wheeled irrigation tower 108 is one of the wheeled irrigation towers 106 where a bend or change in direction beyond a particular or specified degree or amount has occurred. For example, the misaligned wheeled irrigation tower 108 may comprise a point or region at which the pivot 104 changes direction beyond a specified or particular amount or degree. In order to prevent additional problems (e.g., the pivot center 102 falling over, damage to the center pivot irrigation system 100, irrigation failure, etc.), the center pivot irrigation system 100 may include a safety circuit.

The safety circuit may include a switch (e.g., limit switch, micro switch) at each wheeled irrigation tower 106. The safety circuit runs through the switches, which may be closed (e.g., conducting) under normal operation. A voltage (for driving the motorized wheels) may be sourced from the pivot center 102. A safety line may run along the entire length of the pivot 104 and may return on a safety circuit. If the pivot 104 becomes misaligned beyond a particular or specified amount, a switch (e.g., limit switch, micro switch) opens at one of the wheeled irrigation towers 106. For example, the switch at the misaligned wheeled irrigation tower 108 may open. The safety circuit may be read at the pivot center 102. In various embodiments, the safety circuit may have a specified voltage applied. If the safety circuit does not have a specified voltage (e.g., 120 alternating current volts (VAC)), the pivot 104 may stop moving. In other various embodiments, the safety circuit may serve as a neutral line. If a switch on the safety circuit opens, the safety circuit (e.g., neutral line) may be disconnected and the pivot 104 may stop moving. This stoppage may prevent the pivot 104 from falling over. As described above, wheeled irrigation towers 106 may be triggered to move or adjust when they become out of line (by less than the particular or specified amount). When a wheeled irrigation tower 106 becomes misaligned (beyond the particular or specified amount), the safety circuit may be broken, causing the pivot 104 to stop. The term "misaligned" and variations thereof may refer to cases when a wheeled irrigation tower 106 becomes out of line beyond a particular or specified amount or degree and/or when a bend or angle of the pivot 104 at the wheeled irrigation tower 106 is beyond a particular or specified amount or degree. For example, a wheeled irrigation tower 106 may be considered misaligned when the wheeled irrigation tower 106 is far enough out of line to break the safety circuit (e.g., open a limit switch or micro switch in the safety circuit). Additionally or alternatively, a wheeled irrigation tower 106 may be considered misaligned in a case where a corresponding switch in the safety circuit has caused the pivot 104 to stop moving indefinitely.

Figure 6:
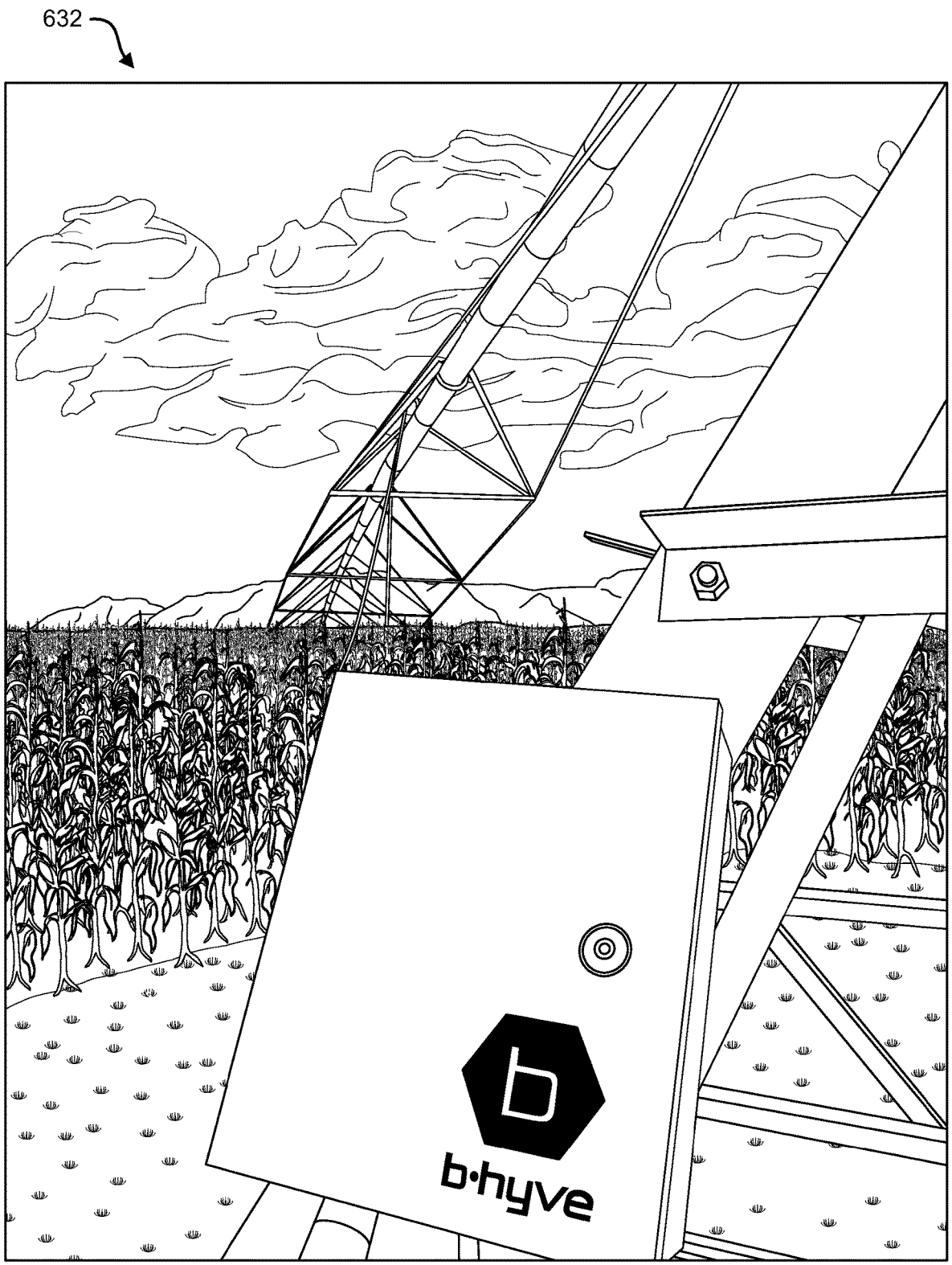
FIG. 6 is an image of a center pivot irrigation system.

It may be difficult to determine which of the wheeled irrigation towers 106 is misaligned. For example, some crops (e.g., corn) may grow to be tall, which may obstruct a view of the wheeled irrigation towers 106, making it difficult to ascertain the misaligned wheeled irrigation tower 108. The image of FIG. 6 provides one example of how crops may obstruct a view of the wheeled irrigation towers 106. In addition, the pivot 104 may be relatively long (e.g., one quarter of a mile long), which may make it difficult to ascertain the misaligned wheeled irrigation tower 108. Furthermore, it may be time-consuming and/or expensive to get an elevated observation of the pivot 104 to ascertain the misaligned wheeled irrigation tower 108. Due to the length of the pivot 104 and/or the point of view of an observer, it may be difficult to identify specifically which wheeled irrigation tower 106 is misaligned. Additionally or alternatively, resources may be wasted in an effort to determine and/or access the misaligned wheeled irrigation tower 108 to address the misalignment. Operational downtime may affect crop watering. In order to address these problems, the systems and methods disclosed herein may provide approaches to detect (e.g., identify, indicate, and/or communicate) information related to a misaligned wheeled irrigation tower 108.

In various embodiments, detection circuitry may be installed in and/or implemented in the center pivot irrigation system 100. As used herein, the term "installed in" and variations thereof may mean to be installed to, installed in, installed on, and/or installed within (e.g., inside of). For example, the detection circuitry may be installed in the pivot center 102, the pivot 104 and/or a wheeled irrigation tower 106. The detection circuitry may identify, indicate, and/or communicate information regarding a misaligned wheeled irrigation tower 108. In order to indicate which wheeled irrigation tower 106 is the misaligned wheeled irrigation tower 108, a voltage (e.g., direct current (DC) voltage (VDC), or alternating current (AC) voltage (VAC)) may be applied to the safety circuit with a test resistance. In various embodiments, the test resistance may be coupled in series with a voltage source. In various embodiments, a filter may be utilized to remove or convert AC voltage in order to isolate DC voltage. For example, a low DC voltage (e.g., 3.3 VDC or other voltage) may be applied to the safety circuit with a high ohm resistor in series with the voltage source. At each wheeled irrigation tower 106, a resistance (e.g., a resistor) may be coupled between the safety circuit and the neutral line. This arrangement may create a voltage divider circuit.

When a wheeled irrigation tower 106 is misaligned, the corresponding switch (e.g., limit switch, micro switch) may open, thereby removing any resistance(s) after the switch. In various embodiments, opening the switch may remove the resistance (e.g., resistor) from that wheeled irrigation tower 106 and/or resistance(s) for any wheeled irrigation tower(s) 106 beyond the misaligned wheeled irrigation tower 108 from the voltage divider circuit. Removing the resistance(s) may increase a measurable voltage. For example, this may increase a voltage that can be read by an Analog to Digital Converter (ADC) on the pivot 104 and/or pivot center 102. The voltage may differ depending on which wheeled irrigation tower 106 is misaligned. Accordingly, the detection circuitry may be implemented in order to identify a misaligned wheeled irrigation tower 108 based on the voltage. For example, the detection circuitry may measure the voltage. Different voltage levels may correspond to different misaligned wheeled irrigation towers 108. In various embodiments, the detection circuitry may convert the measured voltage to a digital voltage signal using an ADC. The detection circuitry may utilize the digital voltage signal to determine the misaligned wheeled irrigation tower 108. For example, the detection circuitry may include digital logic that utilizes a function and/or look-up table to map the digital voltage signal to an indicator of the misaligned wheeled irrigation tower 108. In various embodiments, the detection circuitry may utilize analog signal processing to generate an indicator of the misaligned wheeled irrigation tower 108 (without converting the voltage to a digital signal, for example). Accordingly, the detection circuitry may include digital and/or analog detection circuitry for identifying and/or communicating information regarding the misaligned wheeled irrigation tower 108.

In various embodiments, the detection circuitry may communicate data indicating which of the wheeled irrigation towers 106 is the misaligned wheeled irrigation tower 108 to a remote device. For example, the detection circuitry may send a signal to another device indicating the misaligned wheeled irrigation tower 108. The signal may be communicated using a wired and/or wireless link. For example, the signal may be communicated using a mesh network, Wi-Fi network, cellular network, Ethernet network, and/or one or more other wired and/or wireless networks. In various embodiments, the data may be communicated to a server, computer, smartphone, tablet device, vehicle, and/or other device. One or more devices may notify one or more users which of the wheeled irrigation towers 106 is misaligned. For example, one or more devices may present a message (e.g., misaligned wheeled irrigation tower number, map of the misaligned wheeled irrigation tower 108, diagram on the misaligned wheeled irrigation tower 108, etc.) on a display. In various embodiments, a console on the center pivot or pivot may provide information identifying the misaligned wheeled irrigation tower 108. The console may comprise, for example, a display screen and/or a set of lights to identify the misalignment. In certain embodiments, there may be one light, such as an LED light, that corresponds to each wheeled irrigation tower 106 with the lights arranged (e.g., arranged in a linear fashion) to correspond to the arrangement of the pivot 104.

As described herein, the detection circuitry may identify and/or communicate a misaligned wheeled irrigation tower 108. Examples of detection circuitry may include electronic circuits, integrated circuits, circuits with discrete components (e.g., resistors, capacitors, transistors, metal-oxide-semiconductor field-effect transistors (MOSFETs)), application-specific integrated circuits (ASICs), computers, and/or devices that include one or more processors, memory cells, latches, logic gates, etc. For instance, the detection circuitry may include discrete components and/or a processor (e.g., microprocessor) that may be used to detect (e.g., identify, indicate, and/or communicate) information regarding a misaligned wheeled irrigation tower 108. In various embodiments, the processor may include and/or access software in memory and/or firmware. For example, the detection circuitry may include memory. The memory may be included on-board the processor or may be separate from the processor. The memory may store instructions and/or data (e.g., voltage samples and/or current samples, etc.). Additionally or alternatively, the memory or a separate memory may store firmware. In various embodiments, the detection circuitry may be housed within a box mounted on a structure at or near the pivot center 102.

Figure 2:
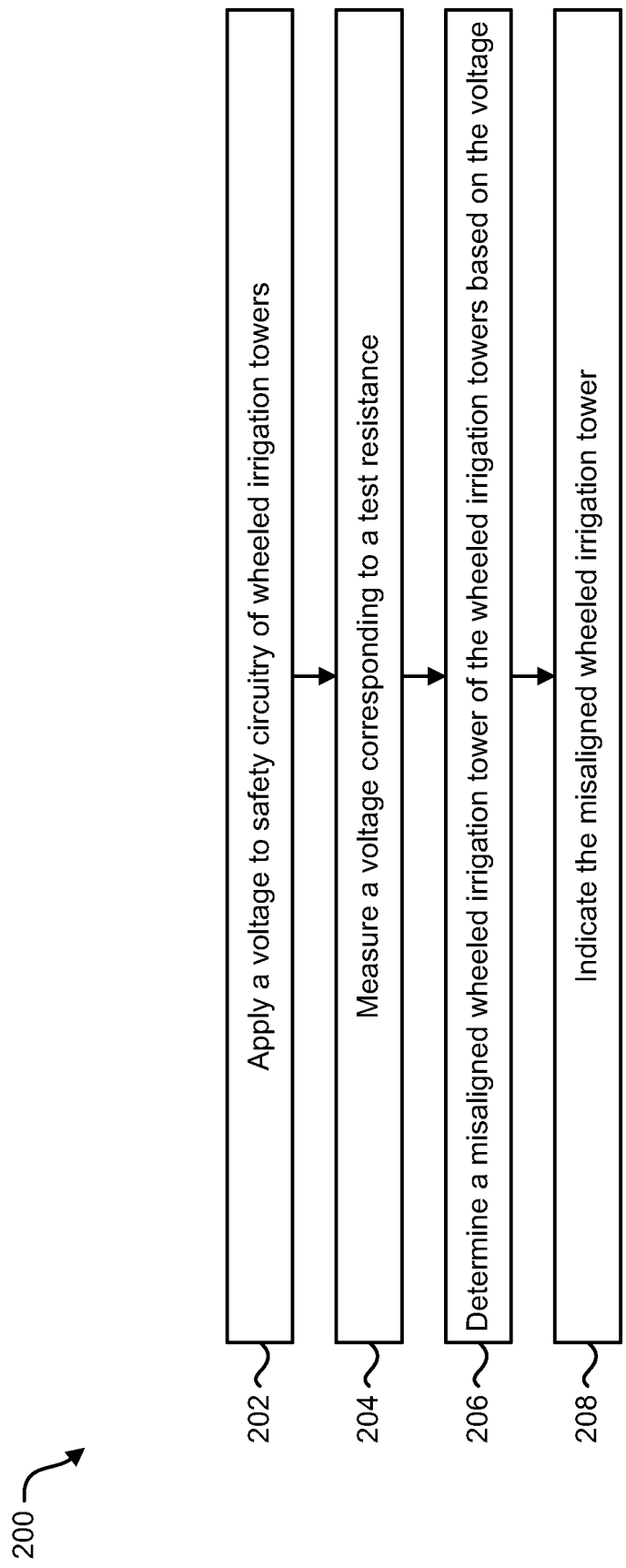
FIG. 2 is a flow diagram illustrating one embodiment of a method for detecting a misaligned wheeled irrigation tower.

FIG. 2 is a flow diagram illustrating one embodiment of a method 200 for detecting a misaligned wheeled irrigation tower. In various embodiments, the method 200 may be performed by the center pivot irrigation system 100 and/or the detection circuitry described in connection with FIG. 1. In various embodiments, the method 200 may be performed by another center pivot irrigation system and/or detection circuitry. For example, the method 200 may be performed in a center pivot irrigation system with a different number of wheeled irrigation towers. A voltage (e.g., DC or AC voltage) may be applied 202 to safety circuitry of wheeled irrigation towers. For example, the voltage may be applied 202 by a center pivot irrigation system and/or detection circuitry. In various embodiments, the voltage may be applied 202 to a return line of the safety circuitry. In various embodiments, a DC or an AC voltage source may be utilized. In various embodiments, the voltage may be applied 202 in response to detecting that the safety circuit is open. For example, when a switch on a return line of the safety circuit is open, the center pivot irrigation system and/or the detection circuitry may apply 202 the voltage to the safety circuitry for measurement. In various embodiments, when a switch on the return line of the safety circuit is open, the center pivot irrigation system may control a relay (at the pivot center, for example) to stop driving a voltage on a forward circuit line or a reverse circuit line, which may halt pivot movement.

A voltage corresponding to a test resistance (e.g., one or more resistors) may be measured 204. For example, the center pivot irrigation system and/or detection circuitry may measure 204 the test resistance. The voltage corresponding to the test resistance may be measured across the test resistance (e.g., from a terminal of the test resistance to neutral or between terminals of the test resistance). In various embodiments, measuring 204 the test resistance may include converting an analog voltage corresponding to the test resistance to a digital voltage and/or sampling the digital voltage. In various embodiments, the test resistance may be coupled in series with the voltage source. In various embodiments, the voltage source may be a voltage supply for the detection circuitry.

A misaligned wheeled irrigation tower of the wheeled irrigation towers may be determined 206 based on the voltage. This may be accomplished as described in relation to FIG. 1. For example, the detection circuitry and/or the center pivot irrigation system may determine a wheeled irrigation tower corresponding to the voltage based on the voltage level (e.g., amplitude). For instance, as more resistances corresponding to the wheeled irrigation towers are excluded from the voltage divider circuit due to an open switch, the voltage level increases. The voltage level may depend on the resistances (e.g., resistors) implemented at each wheeled irrigation tower and/or the supplied voltage. In various embodiments, determining 206 the misaligned wheeled irrigation tower may be based on a mapping between predetermined voltage levels (e.g., voltage ranges)

and the wheeled irrigation towers. For example, the detection circuitry may look up the misaligned wheeled irrigation tower in a look-up table based on the voltage and/or may compare the voltage to one or more thresholds and/or calibration voltages. It should be noted that the detection circuitry may be implemented for different numbers of wheeled irrigation towers (e.g., two or more).

The misaligned wheeled irrigation tower may be indicated 208. For example, the detection circuitry and/or the center pivot irrigation system may indicate 208 the misaligned wheeled irrigation tower (e.g., may provide information regarding the misaligned wheeled irrigation tower). This may be accomplished as described in connection with FIG. 1. For example, detection circuitry may present an indicator on a display and/or may transmit data indicating the misaligned wheeled irrigation tower. In some cases, the indicator may be used to fix the misalignment. In various embodiments, the misalignment may be fixed manually (e.g., a technician may go to the identified misaligned tower to fix the misalignment). Accordingly, the indicator may enable efficient detection and repair of the misalignment, as a technician may be able to go directly to the misaligned tower instead of searching for and/or determining which of the towers is misaligned.

Figure 3:
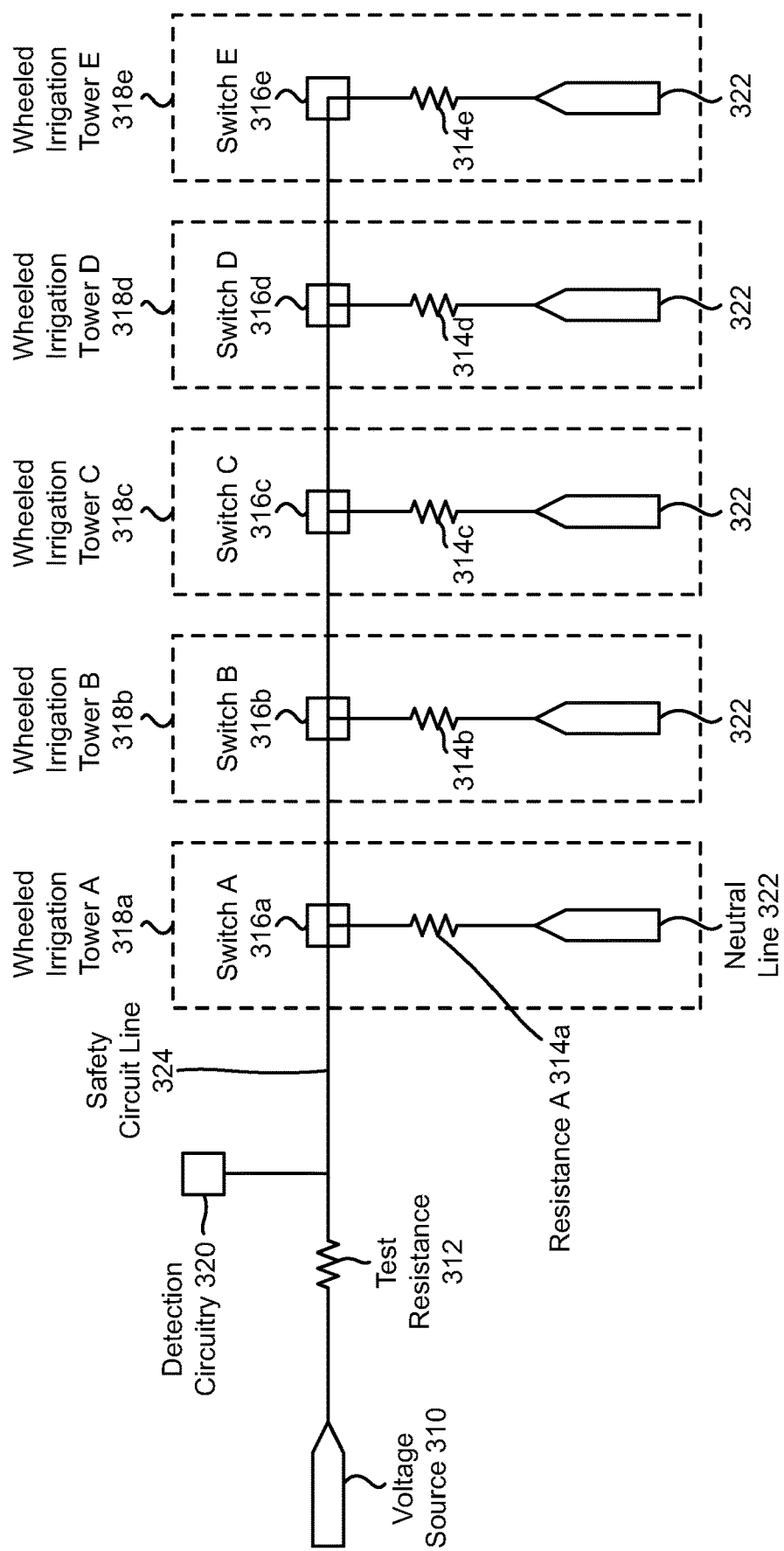
FIG. 3 is a circuit diagram illustrating an example of circuitry for identifying a misaligned wheeled irrigation tower within a plurality of wheeled irrigation towers.

FIG. 3 is a circuit diagram illustrating an example of circuitry for identifying a misaligned wheeled irrigation tower within a plurality of wheeled irrigation towers. The circuitry may include a test resistance 312. The test resistance 312 may be configured for installation in a center pivot irrigation system. For example, the test resistance 312 may include one or more terminals (or may be included in circuitry that includes one or more terminals) for installation in a center pivot irrigation system. The test resistance 312 may be implemented with one or more resistors, one or more impedances, one or more transistors, and/or one or more diodes, for example. In various embodiments, the test resistance 312 may be coupled to a voltage source 310. For example, the circuitry may include or may be coupled to a voltage source 310. Examples of the voltage source 310 include a voltage supply, or a coupling or connection to a voltage supply. In various embodiments, the voltage source 310 may be coupled in series with the test resistance 312 (e.g., RT). In some examples, the voltage source 310 may be an AC or a DC voltage source. In various embodiments, the voltage source 310 may be a DC voltage source that is coupled in series with an AC voltage source.

The circuitry may include a plurality of resistances 314a-e (e.g., resistors). Although five resistances 314a-e are illustrated in FIG. 3, a different number of resistances may be utilized in various embodiments. Each of the plurality of resistances 314a-e may be configured for installation in a wheeled irrigation tower 318a-e of the center pivot irrigation system. In various embodiments, each of the plurality of resistances 314a-e may be configured to be coupled in series with the test resistance 312 (when a corresponding switch 316a-e is closed, for example). In various embodiments, each resistance of the plurality of resistances 314a-e may be configured to be coupled in parallel with each other resistance of the plurality of resistances 314a-e. Each of the plurality of resistances 314a-e may be configured to be coupled to a corresponding switch 316a-e of a respective wheeled irrigation tower 318a-e and to a neutral line 322. For example, each of the resistances 314a-e may be coupled to a terminal or to a wire from a terminal of a corresponding switch 316a-e. In various embodiments, each resistance of the plurality of resistances 314a-e is configured to be separated from the test resistance 312 when the corresponding switch 316a-e is opened as a result of a misalignment between the misaligned wheeled irrigation tower and a neighboring wheeled irrigation tower. In various embodiments, each of the switches 316a-e may be part of or may be coupled to a safety circuit line 324 (e.g., a safety circuit return line). In various embodiments, each of the resistances 314a-e may be coupled to safety circuit line 324 and/or may be coupled between the safety circuit line 324 and neutral 322.

As illustrated in FIG. 3, each wheeled irrigation tower 318a-e may have a corresponding switch 316a-e (e.g., limit switch, micro switch), with a resistance 314a-e coupled between the switch 316a-e and a neutral line 322. In various embodiments, the circuitry illustrated in FIG. 3 may comprise a voltage divider circuit.

An example of a voltage divider circuit may be expressed in accordance with Equation (1)

$$V_{out} = \frac{R_2}{R_1 + R_2} \cdot V_{in} \quad (1)$$

In Equation (1), $V_{in}$ may be an input voltage (e.g., a low input voltage sourced from a control box such as 3.3 VDC or another voltage), $R_2$ may be an example of a test resistance (RT), and $R_1$ may be a parallel resistance value of the resistances 314a-e along the pivot (e.g., an equivalent resistance of the plurality of resistances 314a-e at the wheeled irrigation towers 318a-e). For instance, two resistors in parallel may be combined in accordance with Equation (2).

$$R_{total} = \frac{R_a R_b}{R_a + R_b} \quad (2)$$

For example, $R_{total}$ may be an example of $R_1$ from Equation (1), where $R_a$ and $R_b$ are examples of two parallel resistances 314a-b at two-wheeled irrigation towers 318a-b. Equation (2) may be simplified to Equation (3) if the same value of resistance 314a-e is used along the entire length of the pivot (e.g., at each wheeled irrigation tower).

$$R_{total} = \frac{R}{N} \quad (3)$$

In Equation (3), R is the resistance value at each wheeled irrigation tower 318a-e and N is the number of resistances 314a-e. It should be noted that different resistance values may be used at different wheeled irrigation towers 318a-e in various embodiments, especially if the pivot is long (e.g., 10 or more wheeled irrigation towers).

In some approaches, the circuit illustrated in FIG. 3 may be expressed in accordance with Equation (4).

$$V = I\left(RT + 1 \bigg/ \sum_{n=1}^{N} \frac{1}{R_n}\right) \quad (4)$$

In Equation (1), V is the voltage (e.g., voltage level or amplitude) of the voltage source 310, I is current, RT is the test resistance 312, $R_n$ is the n-th resistance (corresponding to the n-th wheeled irrigation tower 318a-e), and N is a number of wheeled irrigation towers with closed switches (if any) up to the first open switch from the voltage source 310. As can be observed, the voltage over the test resistance 312 (e.g., $V_{RT}$) may change (e.g., increase) as an open switch excludes more wheeled irrigation towers (e.g., as N decreases). Accordingly, a predetermined voltage level may correspond to each potentially misaligned wheeled irrigation tower 318a-e. It should be noted that various values for the voltage of the voltage source 310, the test resistance 312, and/or resistances 314a-e may be utilized. In various embodiments, the test resistance 312 and each resistance 314a-e may be 20 kiloohms (kΩ) and the voltage of the voltage source 310 may be a low voltage.

In various embodiments, the circuitry may include detection circuitry 320. The detection circuitry 320 may be coupled to the test resistance 312. The detection circuitry 320 may be configured (when installed in the center pivot irrigation system, for example) to identify a misaligned wheeled irrigation tower of a plurality of wheeled irrigation towers based on a voltage corresponding to the test resistance 312. For example, the detection circuitry 320 may be configured to identify the misaligned wheeled irrigation tower based on an increase in the voltage corresponding to the test resistance 312 relative to a voltage corresponding to the test resistance 312 when the plurality of wheeled irrigation towers is aligned.

Figure 4:
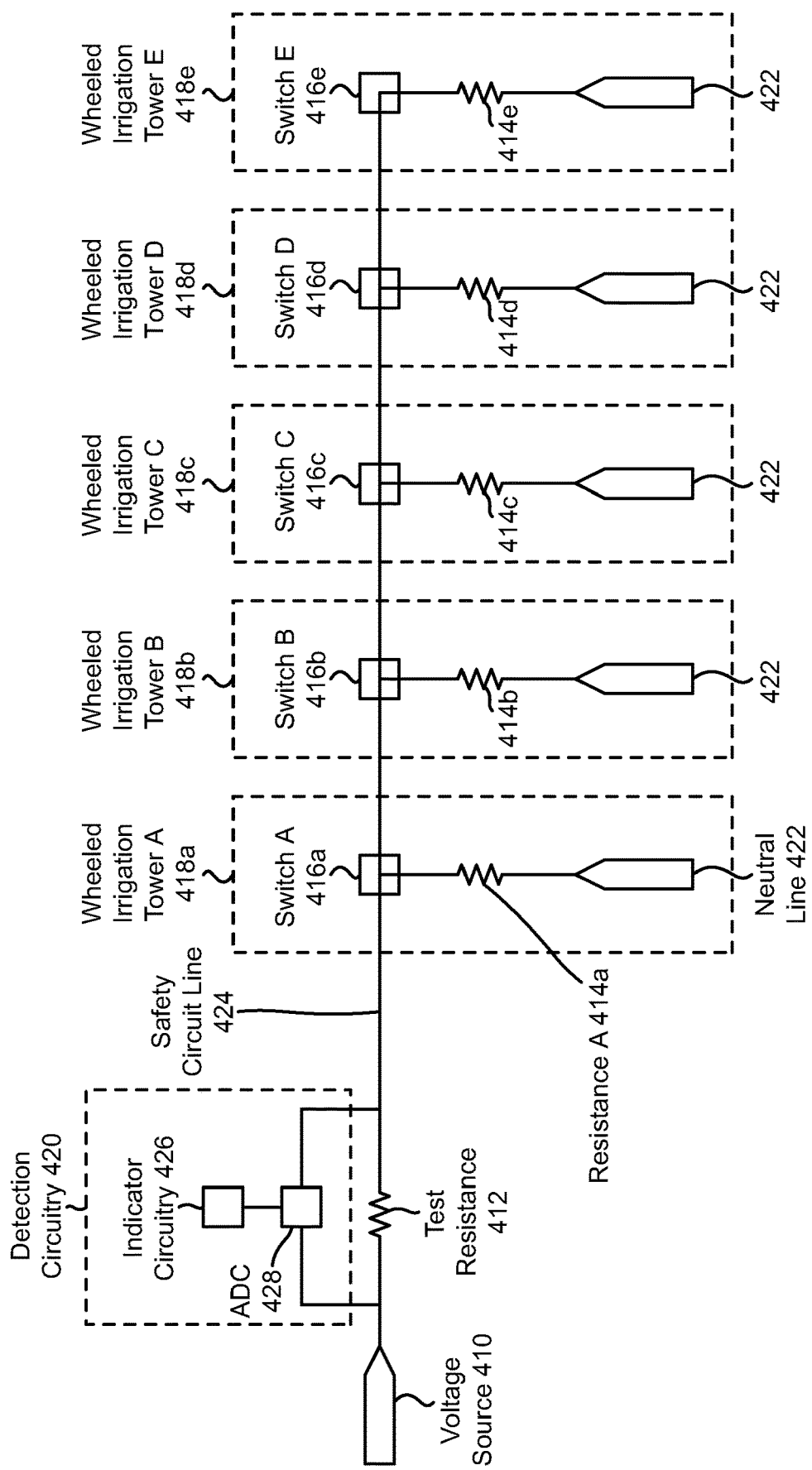
FIG. 4 is a circuit diagram illustrating another example of circuitry for identifying a misaligned wheeled irrigation tower within a plurality of wheeled irrigation towers.

FIG. 4 is a circuit diagram illustrating another example of circuitry for identifying a misaligned wheeled irrigation tower within a plurality of wheeled irrigation towers. The components in FIG. 4 may be similar to the components described in connection with FIG. 3. For example, one or more of the components illustrated in FIG. 4 (a voltage source 410, a test resistance 412, a safety circuit line 424, wheeled irrigation towers 418a-e, switches 416a-e, resistances 414a-e, and/or a neutral line 422) may be configured as described with corresponding components in connection with FIG. 3.

In various embodiments, the detection circuitry 420 may include an analog-to-digital converter 428 (ADC) and/or indicator circuitry 426. The ADC 428 may be coupled to the test resistance 412. For example, the ADC 428 may be coupled to two terminals of the test resistance 412 or may be coupled to one terminal of the test resistance 412 and neutral line 422. The ADC 428 may be configured to convert the voltage corresponding to the test resistance 412 to a digital voltage signal. For example, the ADC 428 may convert an analog voltage over the test resistance 412 to a digital voltage signal. The digital voltage signal may be provided to the indicator circuitry 426.

The indicator circuitry 426 may be coupled to the ADC 428. Examples of the indicator circuitry 426 include a processor, ASIC, digital logic circuitry, integrated circuitry, etc. The indicator circuitry 426 may be configured to identify the misaligned wheeled irrigation tower based on the digital voltage signal. For example, the indicator circuitry 426 may determine, based on the digital voltage signal (e.g., the voltage level or amplitude of the digital voltage signal), which of the wheeled irrigation towers is a misaligned wheeled irrigation tower. For example, the indicator circuitry 426 may identify the misaligned wheeled irrigation tower based on the digital voltage signal and/or may communicate an indicator to another device as described in connection with FIG. 1.

The indicator circuitry 426 may utilize one or more techniques to identify the misaligned wheeled irrigation tower. In various embodiments, the indicator circuitry 426 may be configured to compare the digital voltage signal to at least one threshold voltage. For example, the indicator circuitry 426 may determine the misaligned wheeled irrigation tower based on whether the digital voltage signal satisfies a threshold voltage. In various embodiments, the indicator circuitry 426 may compare the digital voltage signal to a plurality of threshold voltages, where each threshold voltage of the plurality of threshold voltages respectively corresponds to each wheeled irrigation tower of the plurality of wheeled irrigation towers. In various embodiments, the indicator circuitry 426 may be configured to determine a subset of the plurality of threshold voltages that is satisfied and to indicate the misaligned wheeled irrigation tower corresponding to the subset of the plurality of threshold voltages that is satisfied. For example, the indicator circuitry 426 may compare the digital voltage signal to a set of threshold voltages (e.g., increasing threshold voltages) over a range. The subset (or all) of the set of threshold voltages that is or are satisfied may correspond to a particular misaligned wheeled irrigation tower. In various embodiments, the indicator circuitry 426 may identify the misaligned wheeled irrigation tower based on a look-up table. For example, the indicator circuitry 426 may look up the misaligned wheeled irrigation tower corresponding to a value of the digital voltage signal in the look-up table. In various embodiments, the values of the threshold(s) and/or of the look-up table may be determined during a calibration procedure. In various embodiments, the indicator circuitry 426 may be configured to compare the voltage (e.g., digital voltage signal) to one or more voltages (e.g., calibration voltages) corresponding to one or more wheeled irrigation towers to identify the misaligned wheeled irrigation tower. For example, the indicator circuitry 426 may determine which of the calibration voltages is nearest to the voltage (e.g., digital voltage signal). For instance, the indicator circuitry 426 may determine a difference (e.g., distance, subtraction) between the digital voltage signal and each of a set of calibration voltages. The smallest difference between the digital voltage signal and one of the calibration voltages may indicate the misaligned wheeled irrigation tower.

The indicator circuitry 426 may be configured to indicate the misaligned wheeled irrigation tower (e.g., to indicate which of the wheeled irrigation towers is a misaligned irrigation tower). For example, the detection circuitry 420 may include and/or may be coupled to communication circuitry (e.g., a communication interface). The indicator circuitry 426 may provide an identification indication of the wheeled irrigation tower to the communication circuitry. The communication circuitry may be configured to send the identification indication of the misaligned wheeled irrigation tower in response to the detection circuitry 420 identifying the misaligned wheeled irrigation tower. For example, the indicator circuitry 426 may use the communication circuitry to send the identification indication to another device (e.g., to a display, to a smartphone, tablet, computer, laptop, and/or server). Examples of the identification indication may include a number, text, characters, and/or an image, etc. In various embodiments, the communication circuitry may implement one or more communication protocols (e.g., Wi-Fi, long-range Wi-Fi, Zigbee, Long-Term Evolution (LTE), 3G, CDMA, Bluetooth, Ethernet, and/or Universal Serial Bus (USB)).

In various embodiments, the communication circuitry may be configured to receive information during a calibration procedure. For example, the communication circuitry may be configured to receive a plurality of wheeled irrigation tower deactivation indications. The communication circuitry may provide the wheeled irrigation tower deactivation indications to the detection circuitry 420. The detection circuitry may be configured to measure at least one calibration voltage in response to at least one of the plurality of wheeled irrigation tower deactivation indications. For example, when a wheeled irrigation tower deactivation indication is received, the detection circuitry 420 may measure and/or store a calibration voltage corresponding to the test resistance 412. In various embodiments, the detection circuitry 420 may measure a calibration voltage when all of the switches 416a-e are closed (e.g., when all of the wheeled irrigation towers are aligned). As described herein, the calibration voltages may be utilized to identify the misaligned wheeled irrigation tower in various embodiments. For example, a voltage (e.g., the digital voltage signal) may be compared to the calibration voltages. The calibration voltage that is nearest to the digital voltage signal may correspond to the misaligned wheeled irrigation tower. For example, assuming calibration voltages of 100 millivolts (mV), 200 mV, and 300 mV, a digital voltage signal of 150 mV would correspond to (e.g., be nearest to) the 200 mV calibration voltage and a digital voltage signal of 149 mV would correspond to (e.g., be nearest to) the 100 mV calibration voltage. In additional examples, a digital voltage signal of 249 mV would correspond to the 200 mV calibration voltage and a digital voltage signal of 250 mV would correspond to the 300 mV calibration voltage. For instance, neighboring calibration voltages may be used to determine boundaries as halfway between the neighboring calibration voltages. Accordingly, the calibration value that is nearest to the digital voltage signal (within a boundary) may indicate the misaligned wheeled irrigation tower.

In various embodiments, the detection circuitry 420 may be configured to determine a plurality of threshold voltages and/or values of a look-up table based on the at least one calibration voltage. For example, the detection circuitry 420 may determine a set of threshold voltages and/or look-up table values as voltage values between the calibration voltages. For instance, if calibration voltages are 100 millivolts (mV), 200 mV, and 300 mV, the detection circuitry 420 may set thresholds at 150 mV and 250 mV.

In various embodiments, the detection circuitry 420 may include an analog detection circuit configured to identify which of the plurality of wheeled irrigation towers is the misaligned wheeled irrigation tower. For example, the detection circuitry 420 may include one or more operational amplifiers or buffers. For example, a set of operational amplifiers may be tuned with threshold voltages corresponding to the wheeled irrigation towers (e.g., threshold voltages with approximately at 100 to 150 millivolt (mV) difference for each wheeled irrigation tower). For instance, the set of operational amplifiers may drive circuitry that indicates the misaligned wheeled irrigation tower. In an example, the operational amplifiers may drive an array of light emitting diodes (LEDs) to activate, deactivate, and/or change colors to indicate which of the wheeled irrigation towers is the misaligned wheeled irrigation tower.

Figure 5:
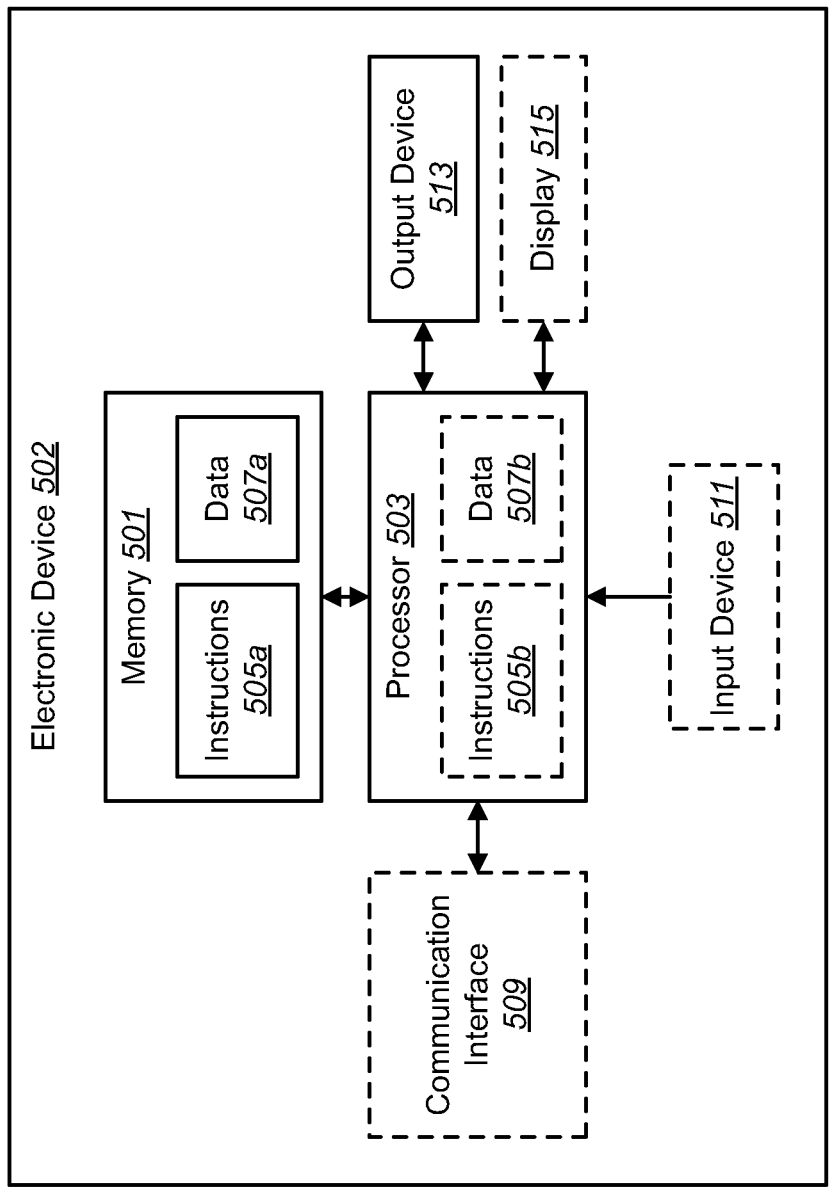
FIG. 5 is a block diagram illustrating various components that may be utilized in an electronic device.

FIG. 5 illustrates various components that may be utilized in an electronic device 502. The electronic device 502 described in connection with FIG. 5 may be configured in accordance with one or more of the circuitries described herein and/or may communicate with one or more of the circuitries described herein. For example, the electronic device 502 may be configured to perform one or more of the methods 200 described herein. The electronic device 502 may include a memory 501, a communication interface 509, an input device 511, a processor 503, an output device 513, a display 515, and/or a display controller 517. The memory 501 may store instructions 505a and data 507a. The processor 503 may operate on instructions 505b and data 507b. It should be noted that the display 515 and/or display controller 517 may not be included in various embodiments. For example, some embodiments of the electronic device 502 may not have a display. Additionally or alternatively, some embodiments of the electronic device 502 may include a button interface (e.g., an input device 511). Some embodiments of the electronic device 502 may be controlled on a remote display device (e.g., a touch panel) with communication through a remote device. In various embodiments, the processor 503 may be configured to identify a misaligned wheeled irrigation tower based on a voltage as described herein.

FIG. 6 is an image 632 of a center pivot irrigation system. In various embodiments, one or more components (e.g., test resistance, resistances, switches, ADCs, detection circuitry, and/or indicator circuitry) may be partially or completely housed in one or more enclosures on one or more structures of the center pivot irrigation system as shown in FIG. 6. For example, an enclosure may be mounted on a pivot center of a center pivot irrigation system in the image 632. A portion of the pivot is also shown in the image 632.

Figure 7:
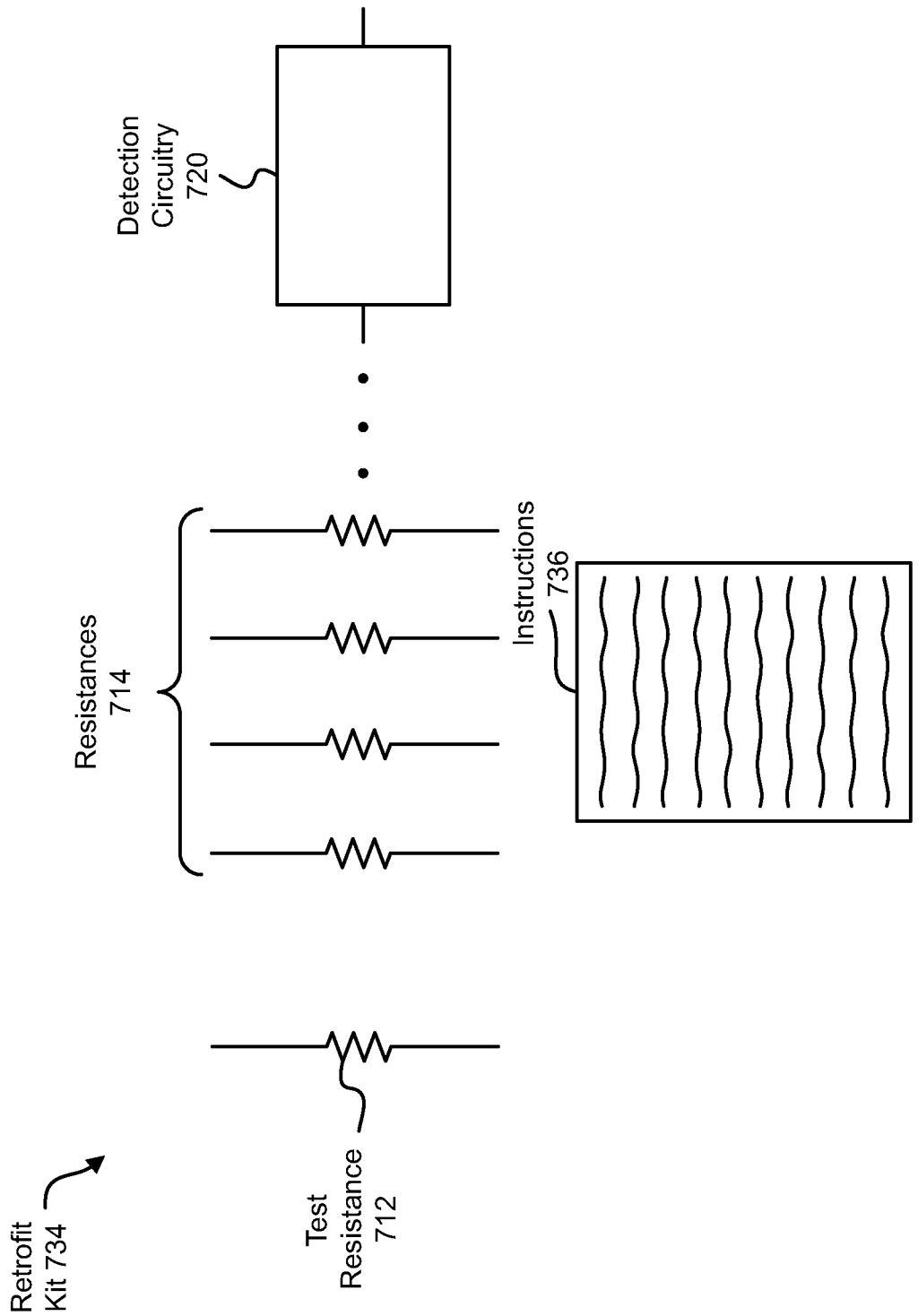
FIG. 7 is a diagram illustrating an example of a retrofit kit.

FIG. 7 is a diagram illustrating an example of a retrofit kit 734. A retrofit kit 734 includes a collection of components configured to be installed in a center pivot irrigation system to enable identification of a misaligned wheeled irrigation tower within a plurality of wheeled irrigation towers.

For example, the retrofit kit 734 may include a test resistance 712 configured to be coupled to a safety circuit of a center pivot irrigation system. For example, the test resistance 712 may include one or more couplers (e.g., threads, clips, wires) to enable installation in the center pivot irrigation system.

The retrofit kit 734 may include a plurality of resistances 714. Each resistance of the plurality of resistances 714 may be configured to be coupled to the safety circuit between a switch and a neutral line of a wheeled irrigation tower. For example, each of the resistances 714 may include one or more couplers (e.g., threads, clips, wires) to enable installation in a respective wheeled irrigation tower of the center pivot irrigation system.

The retrofit kit 734 may include detection circuitry 720 configured to be coupled to the test resistance 712. For example, the detection circuitry 720 may include one or more couplers (e.g., threads, clips, wires) to enable installation in the center pivot irrigation system. In various embodiments, the test resistance 712 may be a part of or may be included within the detection circuitry 720. The detection circuitry 720 may be configured to identify a misaligned wheeled irrigation tower of a plurality of wheeled irrigation towers based on a voltage corresponding to the test resistance 712. The voltage may be based on which of the plurality of resistances is connected to the test resistance 712 via the safety circuit.

In various embodiments, the detection circuitry 720 may be configured to identify the misaligned wheeled irrigation tower based on an increase in the voltage corresponding to the test resistance 712 relative to a voltage corresponding to the test resistance 712 when the plurality of wheeled irrigation towers are aligned. In various embodiments, each resistance of the plurality of resistances 714 is configured to be coupled in parallel with each other resistance of the plurality of resistances 714. For example, each of the resistances 714 may be configured to be coupled between a safety return line and a neutral line of a respective wheeled irrigation tower.

In various embodiments, the detection circuitry 720 may include an ADC configured to convert the voltage to a digital voltage signal. The detection circuitry 720 may also include indicator circuitry configured to identify the misaligned wheeled irrigation tower based on the digital voltage signal, and configured to indicate the misaligned wheeled irrigation tower.

In various embodiments, the retrofit kit 734 may include communication circuitry configured to be coupled to the detection circuitry 720 and/or included in the detection circuitry 720. The communication circuitry may be configured to send an identification indication of the misaligned wheeled irrigation tower in response to the detection circuitry 720 identifying the misaligned wheeled irrigation tower.

In various embodiments, the retrofit kit 734 may include instructions 736 for installing the test resistance 712, the plurality of resistances 714, and the detection circuitry 720 in the center pivot irrigation system. Additionally or alternatively, the instructions 736 may include a printed web address to instructions for installing the test resistance 712, the plurality of resistances 714, and the detection circuitry 720 in the center pivot irrigation system.

Figure 8:
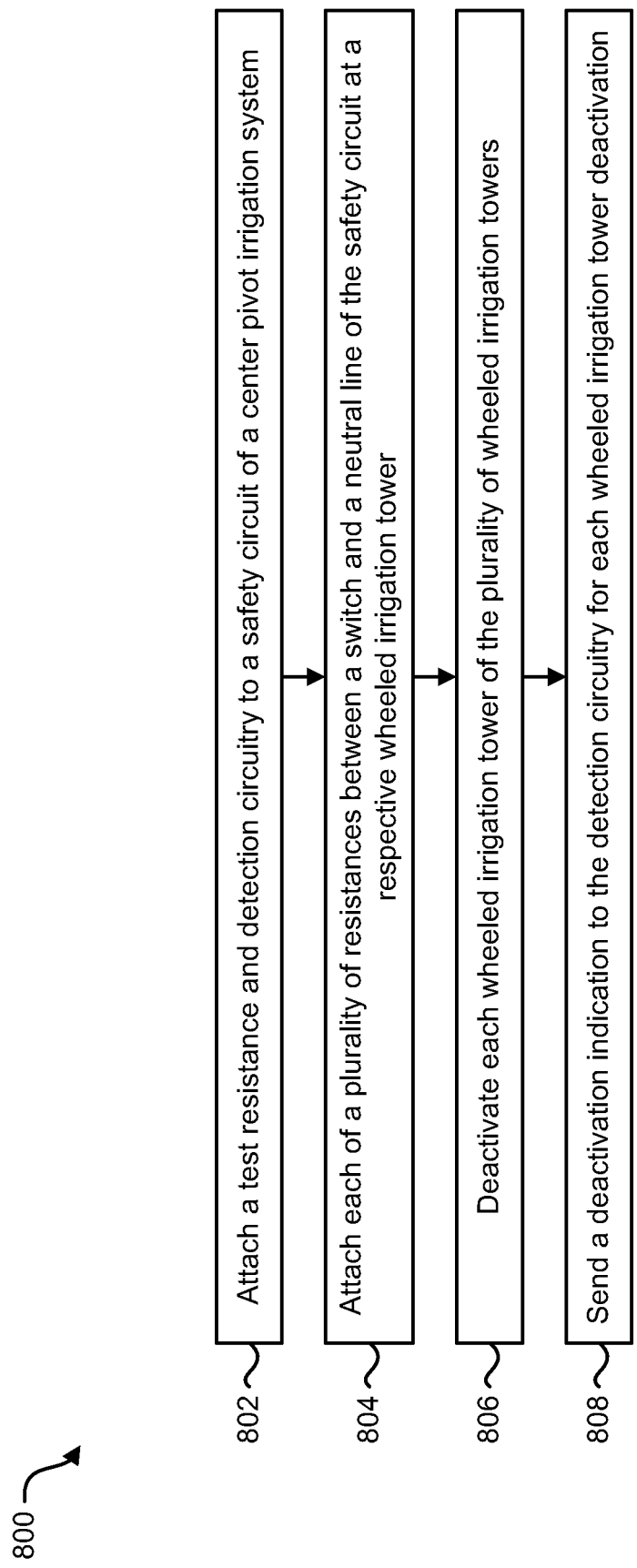
FIG. 8 is a flow diagram illustrating an example of a method for installing a retrofit kit in a center pivot irrigation system to enable identification of a misaligned wheeled irrigation tower.

FIG. 8 is a flow diagram illustrating an example of a method 800 for installing a retrofit kit in a center pivot irrigation system to enable identification of a misaligned wheeled irrigation tower. The method 800 may be performed by a user or technician.

A test resistance 712 may be attached 802 and detection circuitry 720 may be attached 802 to a safety circuit of a center pivot irrigation system. For example, the test resistance 712 and the detection circuitry 720 may be attached to a safety circuit at a pivot center or along the pivot. The detection circuitry 720 may be configured to identify a misaligned wheeled irrigation tower of a plurality of wheeled irrigation towers based on a voltage corresponding to the test resistance 712.

Each of a plurality of resistances 714 may be attached 804 between a switch and a neutral line of the safety circuit at a respective wheeled irrigation tower of the plurality of wheeled irrigation towers. For example, each resistance may be coupled to a terminal of a respective switch and/or the safety circuit return line at a wheeled irrigation tower.

In various embodiments, installing the retrofit kit 734 in the center pivot irrigation system may include a calibration procedure. The calibration procedure may include deactivating 806 each wheeled irrigation tower of the plurality of wheeled irrigation towers. For example, a switch may be (manually or remotely) actuated to deactivate 806 a wheeled irrigation tower. Deactivating 806 the wheeled irrigation tower may disconnect the safety circuit (e.g., safety return line). The calibration procedure may include sending 808 a deactivation indication to the detection circuitry 720 for each wheeled irrigation tower deactivation. For example, a user or technician may use a device (e.g., smartphone, tablet, computer) to send 808 the deactivation indication when each wheeled irrigation tower is deactivated. The detection circuitry 720 may receive the deactivation indication (via communication circuitry, for example) and may measure and store a calibration voltage corresponding to the test resistance 712 for each of the wheeled irrigation tower deactivations. The calibration voltages may be utilized to determine a set of thresholds or a look-up table as described herein. It should be noted that one or more of the steps, functions, or operations described herein may be omitted in various embodiments.

Figure 9:
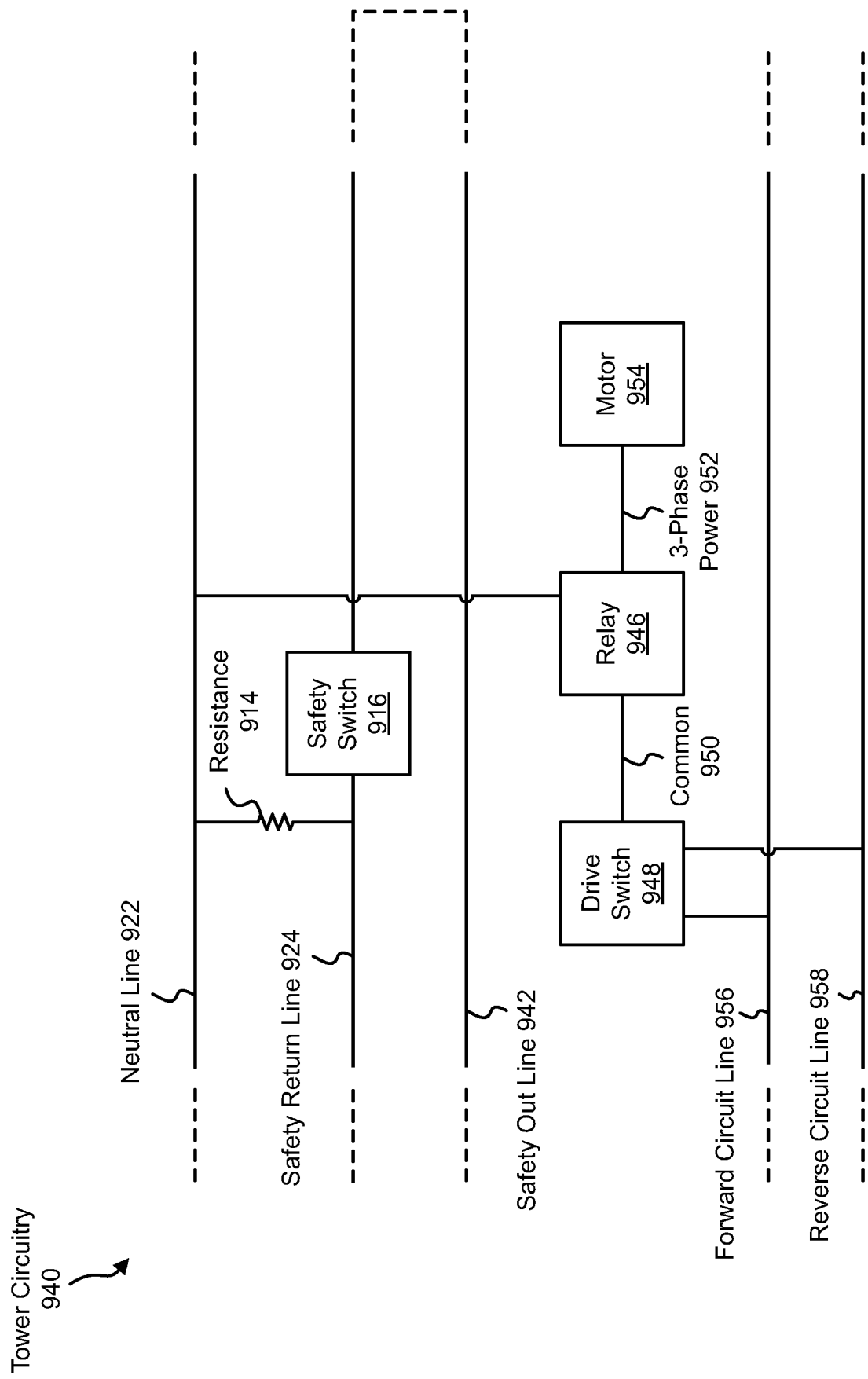
FIG. 9 is a block diagram illustrating an example of wheeled irrigation tower circuitry.

FIG. 9 is a block diagram illustrating an example of wheeled irrigation tower circuitry 940. In particular, FIG. 9 illustrates an example of circuitry that may be included in one or more wheeled irrigation towers (of a center pivot irrigation system, for instance). One or more of the elements or components described in connection with FIG. 9 may be implemented at one or more (e.g., each) wheeled irrigation tower.

In various embodiments, the tower circuitry 940 may include a forward circuit line 956, a reverse circuit line 958, a safety out line 942, a safety return line 924, and a neutral line 922. When active, the forward circuit line 956 may provide voltage for driving the wheeled irrigation towers forward. When active, the reverse circuit line 958 may provide voltage for driving the wheeled irrigation towers in reverse. The forward circuit line 956 may be coupled to a terminal (e.g., normally closed terminal) of a drive switch 948. The reverse circuit line 958 may be coupled to a terminal (e.g., normally open terminal) of the drive switch 948.

The drive switch 948 may be a limit switch or micro switch for driving the wheeled irrigation tower. The drive switch 948 (e.g., a common terminal 950 of the drive switch 948) may be coupled to a relay 946 at the tower. The relay 946 may control whether a motor 954 at the wheeled irrigation tower is supplied with 3-phase power 952 to drive the wheels of the wheeled irrigation tower. The drive switch 948 may be actuated by an alignment bar. The alignment bar may be attached to the pivot center and/or may be attached to the wheeled irrigation tower(s).

When a forward circuit is active, the forward circuit line 956 may be supplied with a voltage (e.g., 120 VAC) and the reverse circuit may be left open. As the pivot moves in forward, the alignment bar will move to activate the drive switch 948. This may allow current to flow from the forward circuit to the relay 946 coil, which may provide 3-phase power 952 to the motor 954. The wheeled irrigation tower will move forward. The alignment bar will consequently move to eventually press the drive switch 948 again, stopping the current flow from the forward circuit line 956 to the relay 946 coil. An opposite procedure may occur when the wheeled irrigation tower travels in reverse.

In the example of FIG. 9, the safety out line 942 loops back at the last wheeled irrigation tower to become the safety return line 924. The safety switch 916 at each wheeled irrigation tower may be on the safety return line. As described herein, the safety switch 916 may be a limit switch or micro switch. The safety switch 916 may be actuated by the alignment bar. It should be noted that the safety switch 916 is distinct from the drive switch 948. For example, the safety switch 916 is part of the safety circuit and is connected to a different line than then drive switch 948. In various embodiments, the allowed range of motion of the safety switch 916 is greater than that of the drive switch 948. This allows the wheeled irrigation tower to realign as it moves around a field. If the tower fails to move for some reason, the alignment bar may continue to move, causing the safety switch 916 to open. The safety switch 916 (e.g., safety circuit return line 924) may control a relay at the pivot center (e.g., a 120 VAC coil relay with a 3-phase 480 VAC load or the motor 954). For example, when the safety switch 916 opens, the safety return line 924 may be disconnected, which may cause the relay at the pivot center to change state, thereby stopping the 3-phase power 952 from driving the motor 954.

As illustrated in the example of FIG. 9, a resistance 914 may be installed between the safety return line 924 and the neutral line 922. If a safety error occurs, a voltage may be applied to the safety return line 924 (from the pivot center and/or detection circuit, for example) and a voltage on the safety return line 924 (e.g., corresponding to a test resistance) may be measured. The voltage may vary based on how many resistances are still in the safety circuit before the open safety switch 916. Accordingly, the varying voltage may be utilized to identify the misaligned wheeled irrigation tower as described herein.

Figure 10:
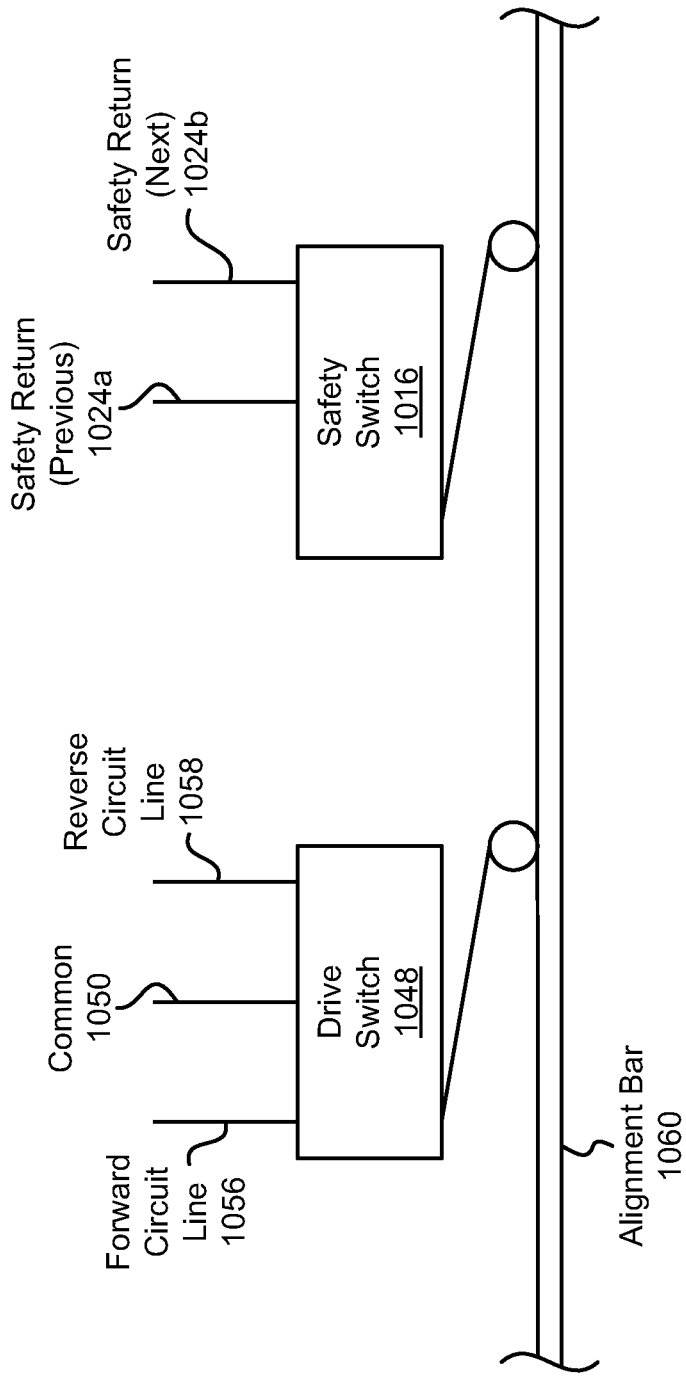
FIG. 10 is a diagram illustrating an example of a drive switch and a safety switch that may be implemented in various embodiments of the systems and methods described herein.

FIG. 10 is a diagram illustrating an example of a drive switch 1048 and a safety switch 1016 that may be implemented in various embodiments of the systems and methods described herein. As illustrated in this example, the drive switch 1048 includes an actuator (e.g., arm) and the safety switch 1016 includes an actuator (e.g., arm). The drive switch 1048 and the safety switch 1016 are actuated by an alignment bar 1060. The alignment bar 1060 may be attached (e.g., anchored) to a pivot center and/or to one or more wheeled irrigation towers.

The drive switch 1048 may be connected to a forward circuit line 1056, a reverse circuit line 1058, and may have a common 1050 terminal. The safety switch 1016 may be connected to a safety return line 1024*a* from a previous wheeled irrigation tower (or pivot center) and to a safety return line 1024*b* to a next wheeled irrigation tower (if any). In various embodiments, opening the safety switch 1016 may stop current from flowing on the safety return line back to the pivot center, which may cause a relay at the pivot center to stop providing power on the forward circuit line 1056 and/or the reverse circuit line 1058. In various embodiments, stopping the current flow on the safety circuit may deactivate a pump, fertigator, and/or chemigator to stop working.

The principles and mechanisms taught in this application may be applied not just to center pivot sprinkling mechanisms, but also to laterals, which comprise a type of sprinkler system that moves in a lateral direction rather than a radial direction.

The term "discrete circuit" refers to an electronic circuit built out of discrete components. Examples of discrete components include resistors, capacitors, inductors, transformers, transistors, etc.

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application-specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The term "computer-readable medium" refers to any available medium that can be accessed by a computer or processor. A computer-readable medium may be non-transitory and tangible. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes, and variations may be made in the arrangement, operation, and details of the systems, methods, and apparatus described herein without departing from the scope of the claims.

What is claimed is:

1. Circuitry for identifying a misaligned wheeled irrigation tower within a plurality of wheeled irrigation towers, the circuitry comprising:
    a test resistance configured for installation in a center pivot irrigation system;
    a plurality of resistances, wherein each of the plurality of resistances is configured for installation in a wheeled irrigation tower of the center pivot irrigation system and to be coupled in series with the test resistance, and wherein each of the plurality of resistances is configured to be coupled to a corresponding switch of a respective wheeled irrigation tower and a neutral line; and
    detection circuitry coupled to the test resistance, wherein the detection circuitry is configured, when installed in the center pivot irrigation system, to identify the misaligned wheeled irrigation tower of the plurality of wheeled irrigation towers based on a voltage corresponding to the test resistance, wherein each resistance of the plurality of resistances is configured to be separated from the test resistance when the corresponding switch is opened as a result of a misalignment between the misaligned wheeled irrigation tower and a neighboring wheeled irrigation tower.

2. The circuitry of claim 1, wherein the detection circuitry is configured to identify the misaligned wheeled irrigation tower based on an increase in the voltage corresponding to the test resistance relative to a first voltage corresponding to the test resistance when the plurality of wheeled irrigation towers are aligned.

3. The circuitry of claim 1, wherein each resistance of the plurality of resistances is configured to be coupled in parallel with each other resistance of the plurality of resistances.

4. The circuitry of claim 1, wherein the detection circuitry comprises:
an analog-to-digital converter configured to convert the voltage to a digital voltage signal; and
indicator circuitry configured to identify the misaligned wheeled irrigation tower based on the digital voltage signal, and configured to indicate the misaligned wheeled irrigation tower.

5. The circuitry of claim 4, wherein the indicator circuitry is a processor configured to compare the digital voltage signal to at least one threshold voltage.

6. The circuitry of claim 4, wherein the detection circuitry is configured to compare the digital voltage signal to one or more calibration voltages.

7. The circuitry of claim 4, wherein the indicator circuitry is configured to identify the misaligned wheeled irrigation tower based on a look-up table.

8. The circuitry of claim 1, wherein the detection circuitry comprises an analog detection circuit configured to identify which of the plurality of wheeled irrigation towers is the misaligned wheeled irrigation tower.

9. The circuitry of claim 1, further comprising communication circuitry coupled to the detection circuitry, wherein the communication circuitry is configured to send an identification indication of the misaligned wheeled irrigation tower in response to the detection circuitry identifying the misaligned wheeled irrigation tower.

10. The circuitry of claim 1, further comprising communication circuitry configured to receive a plurality of wheeled irrigation tower deactivation indications, wherein the detection circuitry is configured to measure at least one calibration voltage in response to at least one of the plurality of wheeled irrigation tower deactivation indications, and to determine a plurality of threshold voltages based on the at least one calibration voltage.

11. A retrofit kit to enable identification of a misaligned wheeled irrigation tower within a plurality of wheeled irrigation towers of a center pivot irrigation system, comprising:
a test resistance configured to be coupled to a safety circuit of the center pivot irrigation system;
a plurality of resistances, wherein each resistance of the plurality of resistances is configured to be coupled to the safety circuit between a switch and a neutral line of a wheeled irrigation tower; and
detection circuitry configured to be coupled to the test resistance, wherein the detection circuitry is configured to identify the misaligned wheeled irrigation tower of the plurality of wheeled irrigation towers based on a voltage corresponding to the test resistance, wherein the voltage is based on which of the plurality of resistances is connected to the test resistance via the safety circuit,
wherein each resistance of the plurality of resistances is configured to be separated from the test resistance when a corresponding switch is opened as a result of a misalignment between the misaligned wheeled irrigation tower and a neighboring wheeled irrigation tower when the retrofit kit is installed in the center pivot irrigation system.

12. The retrofit kit of claim 11, wherein the detection circuitry is configured to identify the misaligned wheeled irrigation tower based on an increase in the voltage corresponding to the test resistance relative to a first voltage corresponding to the test resistance when the plurality of wheeled irrigation towers are aligned.

13. The retrofit kit of claim 11, further comprising communication circuitry configured to receive a plurality of wheeled irrigation tower deactivation indications, wherein the detection circuitry is configured to measure at least one calibration voltage in response to at least one of the plurality of wheeled irrigation tower deactivation indications, and to determine a plurality of threshold voltages based on the at least one calibration voltage when the retrofit kit is installed in the center pivot irrigation system.

14. The retrofit kit of claim 11, wherein the detection circuitry comprises:
an analog-to-digital converter configured to convert the voltage to a digital voltage signal; and
indicator circuitry configured to identify the misaligned wheeled irrigation tower based on the digital voltage signal, and configured to indicate the misaligned wheeled irrigation tower.

15. The retrofit kit of claim 11, further comprising communication circuitry coupled to the detection circuitry, wherein the communication circuitry is configured to send an identification indication of the misaligned wheeled irrigation tower in response to the detection circuitry identifying the misaligned wheeled irrigation tower.

16. The retrofit kit of claim 11, further comprising instructions for installing the test resistance, the plurality of resistances, and the detection circuitry in the center pivot irrigation system.

17. The retrofit kit of claim 11, further comprising a printed web address to instructions for installing the test resistance, the plurality of resistances, and the detection circuitry in the center pivot irrigation system.

18. A method for installing a retrofit kit in a center pivot irrigation system to enable identification of a misaligned wheeled irrigation tower, the method comprising:
attaching a test resistance and detection circuitry to a safety circuit of the center pivot irrigation system, wherein the detection circuitry is configured to identify the misaligned wheeled irrigation tower of a plurality of wheeled irrigation towers based on a voltage corresponding to the test resistance; and
attaching each of a plurality of resistances between a switch and a neutral line of the safety circuit at a respective wheeled irrigation tower of the plurality of wheeled irrigation towers,
wherein each resistance of the plurality of resistances is configured to be separated from the test resistance when a corresponding switch is opened as a result of a misalignment between the misaligned wheeled irrigation tower and a neighboring wheeled irrigation tower when the retrofit kit is installed in the center pivot irrigation system.

19. The method of claim 18, further comprising a calibration procedure, the calibration procedure comprising:
   deactivating each wheeled irrigation tower of the plurality of wheeled irrigation towers; and
   sending a deactivation indication to the detection circuitry for each wheeled irrigation tower deactivation.

20. The method of claim 18, wherein the retrofit kit further comprises communication circuitry configured to receive a plurality of wheeled irrigation tower deactivation indications, wherein the detection circuitry is configured to measure at least one calibration voltage in response to at least one of the plurality of wheeled irrigation tower deactivation indications, and to determine a plurality of threshold voltages based on the at least one calibration voltage when the retrofit kit is installed in the center pivot irrigation system.

\* \* \* \* \*